June 24, 1930.  W. T. McNINCH  1,766,343
BAIL BRACKET FOR EXCAVATING DIPPERS
Filed Nov. 30, 1928
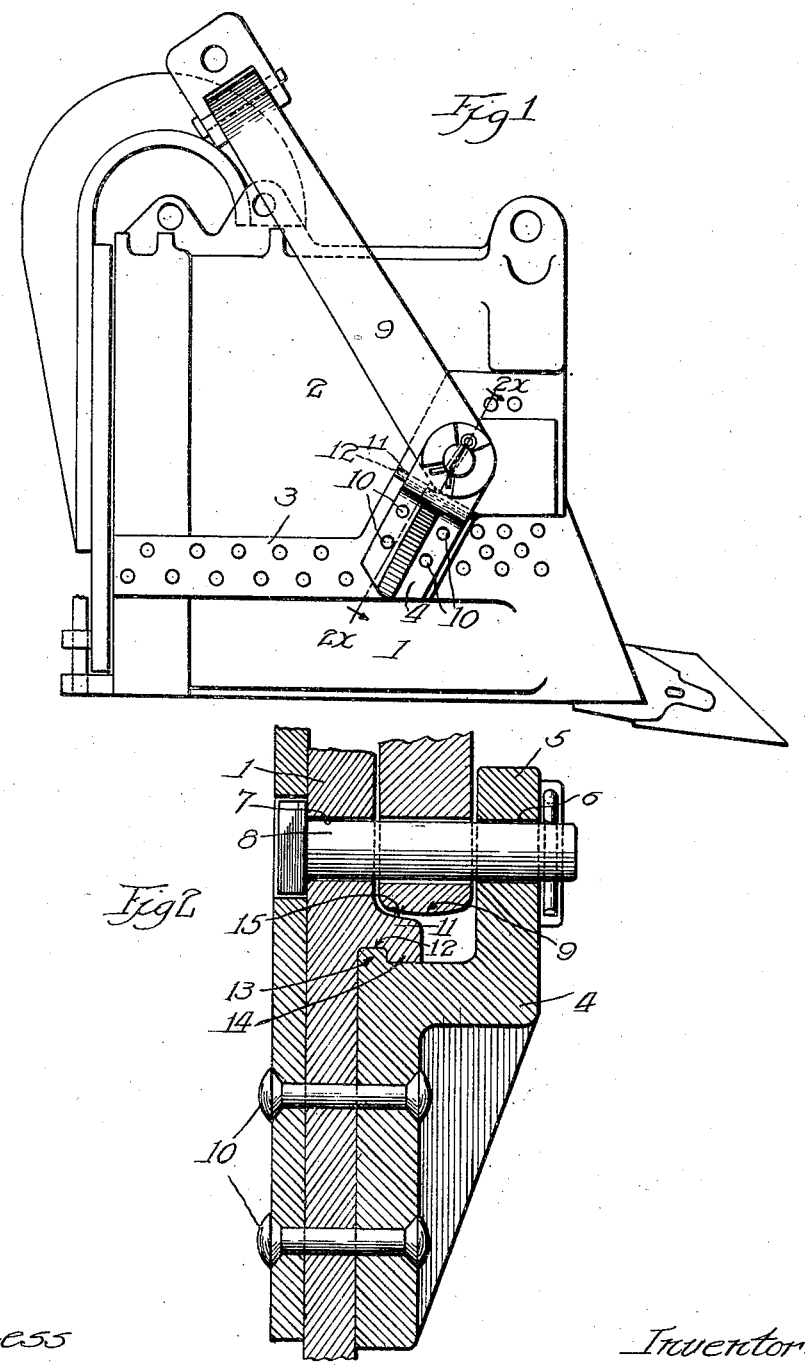
Witness
R. B. Davison
Inventor:
William T. McNinch
By Wilkinson, Huxley, Byron & Knight
Attys.

Patented June 24, 1930

1,766,343

UNITED STATES PATENT OFFICE

WILLIAM T. McNINCH, OF CHICAGO HEIGHTS, ILLINOIS, ASSIGNOR TO AMERICAN MANGANESE STEEL COMPANY, OF CHICAGO, ILLINOIS, A CORPORATION OF MAINE

BAIL BRACKET FOR EXCAVATING DIPPERS

Application filed November 30, 1928. Serial No. 322,637.

This invention relates to excavating implements of the kind which employ digging and containing members supported through means of a bail, and particularly the means employed for connecting the bails with the digging and containing members in such implements. The invention will be described with particular reference to an excavating dipper, but it is to be understood as including in its scope other implements as well.

The object of the invention is to provide a means of mounting the bail bracket on the implement which will embody a substantial interlock between the bracket and the implement capable of resisting displacement of the bracket relatively to the implement, both in the direction of the lift and in a direction outwardly from the implement, and thereby largely relieving the rivets from shearing and tensional strains; and to this end, one feature of the invention consists in providing a mortise and tenon joint between the bracket and the wall of the implement, the mortise being presented substantially in the plane of the bail arm that is to be connected, so that there is both a shoulder on the implement which receives the bracket and resists its displacement in the direction of loading, and an overlap between the bracket and a portion of the implement which prevents outward displacement of the bracket relatively to the implement.

Another object is to provide means whereby the thrust and impact of the bail, which is usually borne by the bail pin, will be largely or wholly taken off of the pin in the direction opposite to lifting; and to this end, another feature of the invention consists in arranging a shoulder on the implement opposite the pivoted end of the bail and sufficiently close to the latter to permit the end of the bail to strike against the shoulder when the dipper is dropped.

In order that the invention may be fully understood, the preferred embodiment thereof will be described in detail in connection with the accompanying drawing, in which—

Figure 1 is a side elevation of a dipper of standard construction in which the bracket is mounted in accordance with the invention; and Figure 2 is a section on an enlarged scale on the line 2ˣ 2ˣ of Figure 1.

1 represents the front member and 2 the body member or back of a dipper of standard construction, which members are united by the usual riveted lap joint 3. 4 represents a bracket which is preferably mounted on the front member 1 in accordance with existing practice, which bracket has an offset ear 5 spaced from the implement, for instance, the wall 1, and provided with pintle opening 6 which is aligned with a pintle opening 7 in the wall of the implement in order to receive the usual pintle 8 through which the bail 9 is connected to the implement.

In addition to being connected with the implement through means of rivets such as shown at 10, the bracket 4 is received into bearing on the implement in the direction of lift through means of a shoulder 11 extending perpendicularly to said direction, across the offset portion of the bracket; and said shoulder is constructed with a mortise 12 presented in the direction opposite to the said lift and receiving a tenon 13 projecting from the offset of the bracket, the direction of lift so as to develop an interlock between the bracket and the implement which not only resists displacement of the bracket in the plane of the wall of the implement and in the direction of lifting by reason of the abutment, but in a direction perpendicular to said plane, or outwardly from the implement under side thrust of the bail, by reason of the overlap of the mortise wall 14 with the tenon 13. Such an arrangement greatly relieves the attaching rivets 10 of both shearing strains imposed at the time of lifting the excavating member through means of the bail, and strains of tension imposed by outward thrust of the bail in the lateral control of the excavating member and also at the time of dropping.

The shoulder 11 is constructed with a surface 15 presented toward the hinging end of the bail 9 and in such proximity thereto that it will receive impingement of the bail arm when the bucket is dropped, the backlash or looseness of the bail arm on the pintle 8 being taken into account in designing the surface 15. Owing to the very considerable mass of metal that must enter into the construction of the lifting bail in securing necessary lifting capacity, serious stresses are imposed on the bail pintles when the dipper is dropped to pick up a load, and these stresses will be largely eliminated if the inner ends of the bail arms are permitted to seat upon surfaces such as 15 rather than transmit their thrust downwardly against their pintles.

I claim:

1. In an excavating implement, an offset bracket mounted upon a surface of said implement through which to attach its lifting connection, and a shoulder on said implement providing abutment for the offset of said bracket in the direction of lifting; said shoulder extending in the plane of the offset of the bracket and perpendicularly to said direction; and said bracket and shoulder being constructed, one with a mortise and the other with a tenon, interengaging against relative movement of the bracket in a direction perpendicular to the surface of the implement upon which the bracket is mounted.

2. In an excavating implement having a bail and a bracket and pintle through which to connect the bail with the implement, a shoulder carried by the implement against which the bracket seats in the direction of lifting; said shoulder extending transversely to said direction and being constructed with a seat located immediately beyond the inner end of the bail and receiving thrust of the inner end of the bail in a direction opposite to the direction of lifting, and thereby lessening the thrust of the bail upon the pintle when the implement is dropped upon the ground.

3. In an excavating implement having a bail and a bracket and pintle through which to connect the bail with the implement, a shoulder against which the bracket seats in the direction of lifting; said shoulder being constructed with a seat immediately inward from the inner end of the bail and directly receiving thrust of the inner end of the bail in a direction opposite the direction of lifting, thereby lessening the shock of the bail upon the pintle when the implement is dropped; said bracket and shoulder having mortise and tenon interengagement in the direction to prevent separation of the bracket from the implement, and by said interengagement also resisting lateral displacement of the bail from said seat.

Signed at Chicago Heights, Illinois, this 26th day of November, 1928.

WILLIAM T. McNINCH.